United States Patent [19]
Cherry

[11] 3,770,996
[45] Nov. 6, 1973

[54] REGULATED COMMUTATED ALTERNATOR

[75] Inventor: James R. Cherry, Barrington, Ill.
[73] Assignee: Motorola, Inc., Franklin Park, Ill.
[22] Filed: Sept. 23, 1971
[21] Appl. No.: 183,188

[52] U.S. Cl. .............................. 310/68 D, 310/166
[51] Int. Cl. ............................................ H02k 11/00
[58] Field of Search.................. 310/68, 68 D, 156, 310/46, 166, 223, 263, 112, 114, 113

[56] References Cited
UNITED STATES PATENTS

| | | | |
|---|---|---|---|
| 3,361,915 | 1/1968 | Baker | 310/68 |
| 3,590,291 | 6/1971 | Spisak | 310/68 D |
| 3,422,339 | 1/1969 | Baker | 310/68 |
| 2,414,287 | 1/1947 | Crever | 310/68 D |
| 3,184,625 | 5/1965 | Farison | 310/68 D |
| 3,329,841 | 7/1967 | Binder | 310/68 |
| 3,329,840 | 7/1967 | Binder | 310/68 |

*Primary Examiner*—R. Skudy
*Attorney*—Vincent Rauner et al.

[57] ABSTRACT

A commutated alternator having a direct current excitable field winding mounted on a rotating shaft and useful for generating alternating current output from an electrical stator, includes a rotatable commutator mounted on the shaft for rectifying the alternating current output of the stator to direct current. A regulator is mounted on the shaft for rotation therewith and is connected in electrical series between the commutator and the field winding for providing regulation of the direct current output of the commutator to the field winding of the alternator.

3 Claims, 4 Drawing Figures

PATENTED NOV 6 1973 3,770,996

REGULATED COMMUTATED ALTERNATOR

BACKGROUND

This invention relates to regulated commutated alternators, and more particularly, to such an alternator having the regulator mounted on a rotating shaft common to the commutator and the field winding of the alternator for eliminating contact brushes.

It is known to provide a mechanical rotating commutator for rectifying the alternating current generated in the stator or armature winding of an alternator, and to directly connect the rectified current to the field coil winding of the alternator to maintain the magnetic field threading the armature winding. However, in applications for alternators such as automobile vehicles both the alternating and direct current outputs of the alternator desirably should be regulated for protecting against overloads. Standard automobile regulators are normally mounted exteriorly to the alternator, and, because they are fixed in a stationary position, require that commutator and field contact brushes be used to connect the regulator between the commutator and the field winding of the alternator. It is now proposed that the regulator be mounted on the rotating shaft of the alternator which is common to both the commutator and the field winding so as to eliminate the contact brushes required to transfer from a moving commutator to a fixed regulator and back again to a moving field winding.

SUMMARY

It is therefore an object of the present invention to provide a regulator mounted on the shaft of an alternator for rotation therewith and to be connected in electrical series between the commutator and the field winding for providing regulation of the alternator output.

An electrical alternator including a stator or armature winding, a rotatable shaft, a field coil winding mounted on the shaft for rotation therewith, and a mechanical commutator mounted on the shaft for rectifying the generated alternating currents of the stator to direct current for maintaining the magnetic fields of the field winding. A regulator is mounted on the shaft for rotation therewith and is connected in electrical series between the commutator and the field winding for providing regulation of the direct current output of the commutator to the field winding.

THE DRAWING

DETAILED DESCRIPTION

Figure 1:
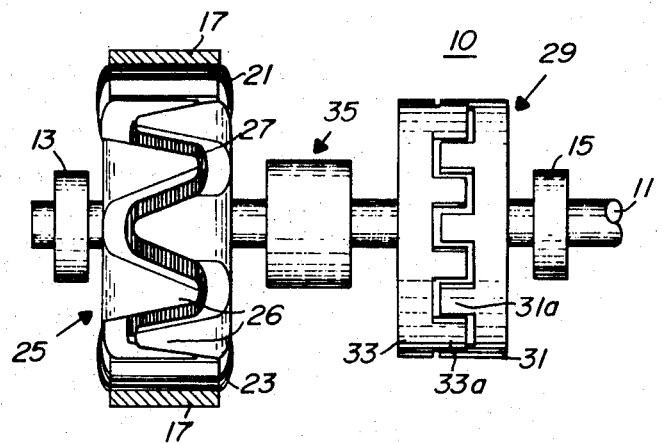
FIG. 1 is an elevational side plan view partly in section of a mechanical commutated alternator having a regulator mounted on the shaft in accordance with the present invention.

Referring to the drawing, FIG. 1 shows the internal operational parts of an electrical alternator 10 such as is suitable for supplying alternating and direct current electrical loads in automobile vehicles. A common shaft 11 is provided with a pair of opposite and spaced apart roller bearings 13 and 15 for rotatably mounting the common shaft 11 in a protective outer casing or housing (not shown). An electrical stator or armature 17 contains a plurality of individual wire coils or windings, such as indicated at 21 and 23 in FIG. 1, which combine to produce a sinusoidal induced emf, as is well known for alternators, through the action of a rotating rotor 25.

The rotor 25 is mounted concentrically on the shaft 11 and rotatably driven from some external source such as a pulley and drive belt. The rotor 25 contains a direct current excitable field coil winding 27 which is used to magnetize the interleaving teeth or fingers 26 of an enclosing rotor casing through electromagnetic action.

A mechanical rotatable commutator 29 is used as a rectifier to convert alternating current into direct current to be used to supply direct current loads and the field winding 27. The commutator 29 includes a pair of adjacent plates 31 and 33 having interleaving teeth segments 31a and 33a, respectively. The number of segments in the commutator 29 depends largely upon the number and electrical connections of the armature coils.

Figure 2:
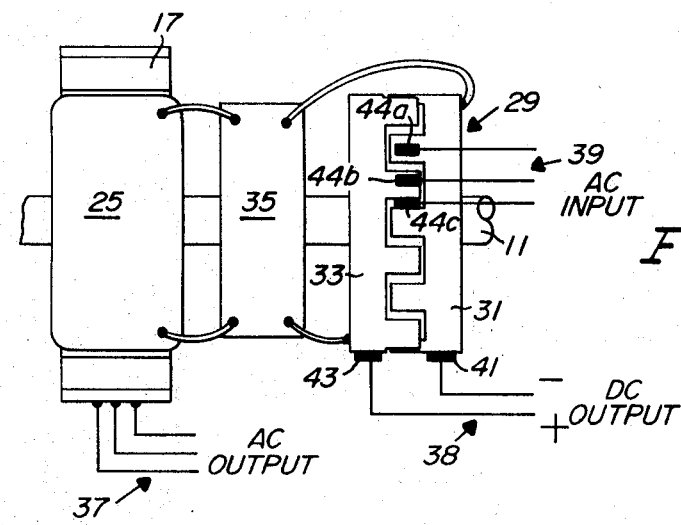
FIG. 2 is an illustration of the parts of the alternator of FIG. 1 and showing simplified electrical connections of the regulator to a commutator and a field winding.

Now in accordance with the present invention, a voltage regulator 35 is mounted concentrically on the shaft 11 and positioned between the commutator 29 and the rotor 25. FIG. 2 shows a simplified illustration of the parts of the alternator 10 of FIG. 1 wherein the two plates 31 and 33 are shown to have a negative (−) and positive (+) voltage potential, respectively, and are electrically connected to the regulator 35. The regulator 35 is preferably connected in electrical series between the commutator 29 and the field winding 27. The stator 17 is shown as having an AC output from wire leads 37. A DC output from wire leads 38 is provided through commutator contact brushes 41 and 43 from the commutator 29. The AC output 37 can be used to supply an AC input at wire leads 39 to the rectifying commutator 29 through contact brushes 44a, 44b and 44c.

Figure 3:
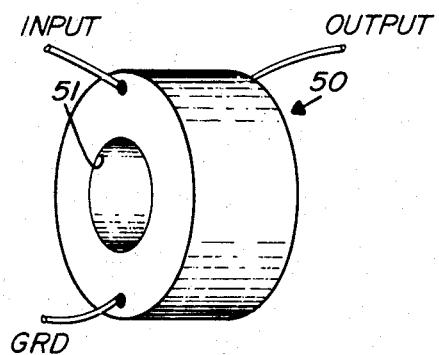
FIG. 3 is a perspective view of the regulator housing shown in FIG. 1.
Figure 4:
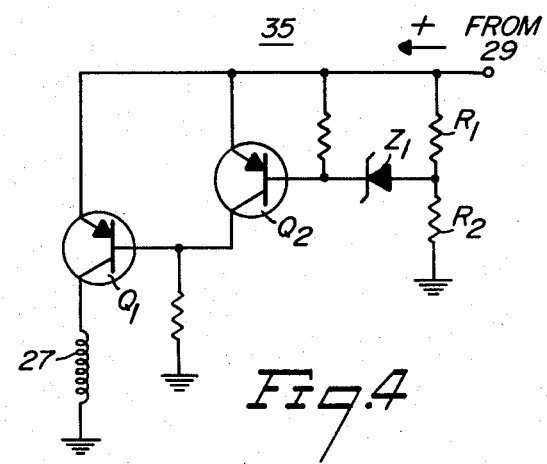
FIG. 4 is an electrical diagram of the regulator and the field winding of FIG. 1.

FIG. 4 shows the electrical schematic diagram of the voltage regulator 35 connected between the commutator 29 and the field winding 27. The regulator circuit of FIG. 4 is a typical solid state regulator and is conveniently enclosed in the regulator housing 50 of FIG. 3. The housing 50 contains a central axis opening 51 for receiving the shaft 11. The tubular shape of the housing 50 comprises an excellent means for providing regulator components to be mounted about the spinning shaft 11 for decreasing the adverse effects of centrifugal force on the components.

The regulator circuit includes a power amplifier transistor $Q_1$ typically shown as an PNP-type transistor which is normally conductive to supply the field winding 27 from the commutator 29. A driver transistor $Q_2$ has its collector connected to the base of the transistor $Q_1$ and is normally off. The base of the transistor $Q_2$ is connected to a zener diode $Z_1$ which is made selectively conductive at a voltage set by a voltage divider network $R_1$ and $R_2$. When the voltage supply from the commutator 29 exceeds the breakdown voltage of the zener diode, the zener conducts to cause the transistor $Q_2$ to conduct and the transistor $Q_1$ to cut off, thus regulating the output of the alternator through regulation of the field winding 27.

It is to be understood that while the present invention has been shown and described with reference to a preferred embodiment thereof, the invention is not limited to the precise form set forth herein, and that various modifications and changes may be made therein without departing from the spirit and scope of the present invention.

1. A commutated alternator arrangement including in combination: an alternator comprising a rotor, a shaft upon which said rotor is mounted for rotation, a field coil carried by said rotor for rotation therewith, a stator surrounding said rotor, windings carried by said stator from which an alternating current output of said alternator is obtained, a commutator device having stationary brushes connectible electrically to the stator windings of said alternator for receiving alternating current therefrom and a rotating portion having terminals, mounted on said shaft for rotation with said alternator rotor and a voltage regulator having an input and output, also mounted on said shaft for rotation with said alternator rotor, the input of said voltage regulator being connected to the terminals of said rotating portion of said commutator device and the output thereof being connected to said field winding for regulating the flow of direct current from said commutator to said alternator field winding, thereby to control the operation of said alternator.

2. The regulator of claim 1 wherein said regulator is comprised of solid state components.

3. The regulator of claim 2 wherein said solid state components are included in a regulator housing of tubular structure for being concentrically received on said shaft, and said components are approximately uniformly distributed in said housing about said shaft for decreasing the affects of centrifugal force thereon.

* * * * *